US012049343B2

(12) United States Patent
Kim et al.

(10) Patent No.: US 12,049,343 B2
(45) Date of Patent: Jul. 30, 2024

(54) BAKERY TRAY

(71) Applicants: Jin Woo Kim, Seoul (KR); Kang Heon Seo, Yongin-si (KR)

(72) Inventors: Jin Woo Kim, Seoul (KR); Kang Heon Seo, Yongin-si (KR)

( * ) Notice: Subject to any disclaimer, the term of this patent is extended or adjusted under 35 U.S.C. 154(b) by 201 days.

(21) Appl. No.: 17/640,952

(22) PCT Filed: Mar. 24, 2020

(86) PCT No.: PCT/KR2020/004019
§ 371 (c)(1),
(2) Date: Apr. 19, 2022

(87) PCT Pub. No.: WO2021/045340
PCT Pub. Date: Mar. 11, 2021

(65) Prior Publication Data

US 2022/0332467 A1 Oct. 20, 2022

(30) Foreign Application Priority Data

Sep. 6, 2019 (KR) ........................ 20-2019-0003698

(51) Int. Cl.

| | |
|---|---|
| ***B65D 85/36*** | (2006.01) |
| ***A45C 11/20*** | (2006.01) |
| ***A47F 5/00*** | (2006.01) |
| ***A47F 7/00*** | (2006.01) |
| ***B65D 25/04*** | (2006.01) |
| ***G09F 3/08*** | (2006.01) |

(52) U.S. Cl.
CPC ............ *B65D 25/04* (2013.01); *A47F 5/0043* (2013.01); *A47F 7/0071* (2013.01); *G09F 3/08* (2013.01)

(58) Field of Classification Search
CPC ....... B65D 85/36; B65D 2203/00; A47F 5/00; A47F 5/0043; G09F 3/08; G09F 3/204; G09F 23/06
USPC ............... 206/425, 449, 551, 561, 562, 565; 40/642.02, 658; 248/213.2, 309.1
See application file for complete search history.

(56) References Cited

U.S. PATENT DOCUMENTS 2,981,039 A * 4/1961 Pohl ........................ B65B 43/08
53/457
5,899,353 A * 5/1999 Sabin ....................... A21D 8/06
220/512
(Continued)

FOREIGN PATENT DOCUMENTS

CN 207084645 U 3/2018
JP 06-077617 U 11/1994
(Continued)

*Primary Examiner* — Luan K Bui
(74) *Attorney, Agent, or Firm* — NKL LAW; Jae Youn Kim

(57) ABSTRACT

A tray for displaying products in a bakery is disclosed. The tray for displaying products in a bakery includes: a display plate having a holder formed at an end portion thereof; and a perforated plate placed on an upper side of the display plate, wherein the display plate includes side plates on front, rear, left, and right sides thereof so that the perforated plate is seated on the upper side of the display plate, to form a space for accommodating the perforated plate, and at least one of the side plates on the front and rear sides of the display plate is provided with a holder in which a name card is to be inserted.

2 Claims, 12 Drawing Sheets

(56) References Cited

U.S. PATENT DOCUMENTS

| | | | | |
|---|---|---|---|---|
| 5,912,033 | A * | 6/1999 | Ferguson | B65D 25/02 426/119 |
| 6,019,221 | A * | 2/2000 | Benja-Athon | B65D 25/108 206/499 |
| 6,296,120 | B1 * | 10/2001 | Danko | B65D 5/503 229/906 |
| 2003/0213718 | A1 * | 11/2003 | Ducharme | B65D 77/0433 206/503 |
| 2007/0215517 | A1 * | 9/2007 | Holler | H01L 21/67333 206/561 |
| 2014/0117179 | A1 * | 5/2014 | Valls | G09F 3/16 248/299.1 |

FOREIGN PATENT DOCUMENTS

| | | | |
|---|---|---|---|
| JP | H07001855 | U | 1/1995 |
| JP | H7025867 | U | 5/1995 |
| JP | 3058463 | U | 6/1999 |
| KR | 200389645 | Y1 | 7/2005 |

* cited by examiner

BAKERY TRAY

TECHNICAL FIELD

The present disclosure relates to a tray for a bakery, and more particularly, to a tray for a bakery, which is capable of containing cakes or bread.

BACKGROUND ART

In general, a display tray for displaying products in a bakery, etc. is manufactured by bending or welding a metal plate. A display tray is provided with a name holder in which a name card indicating a product name and product price is inserted. A name holder according to the related art is formed separately from the tray and welded to a front surface of the tray.

However, as described above, according to the related art, because the name holder is formed separately from the tray, in order to manufacture a tray with a name holder, the name holder is manufactured first according to specifications of the tray and then welded to a previously manufactured shelf via welding, which makes manufacturing processes complicated. Therefore, manufacturing costs increase, and because the name holder is separately manufactured and then coupled to the tray, the exterior is not excellent.

DESCRIPTION OF EMBODIMENTS

Technical Problem

Therefore, to address the above issue, the present disclosure provides a tray for display in a bakery including: a display plate having a holder formed at an end portion thereof; and a perforated plate placed on an upper side of the display plate, wherein the display plate has side plates at front, rear, left, and right sides thereof so that a space for accommodating the perforated plate is formed and the perforated plate is seated on the upper side of the display plate, and at least one of the side plates at the front and rear sides of the display plate has the holder in which a name card may be inserted.

Solution to Problem

In order to achieve the purpose, a tray for displaying products in a bakery according to the present disclosure includes: a display plate having a holder formed at an end portion thereof; and a perforated plate placed on an upper side of the display plate, wherein the display plate has side plates at front, rear, left, and right sides thereof so that a space for accommodating the perforated plate is formed and the perforated plate is seated on the upper side of the display plate, and at least one of the side plates at the front and rear sides of the display plate has the holder in which a name card may be inserted.

In addition, the holder may have a groove into which a business card or a name card may be inserted.

The holder may include: a horizontal extension flange that extends horizontally from the side plate at an end portion of the display plate to a certain length; a downward flange that is bent and extends downward from the horizontal extension flange; and an upward flange that is bent and extends upward from the downward flange to form a groove.

The side plate of the display plate may have a height of about 13 mm to about 17 mm perpendicularly from a bottom surface, and the horizontal extension flange extending from an end portion of the side plate of the display tray may have a length of about 8 mm to about 11 mm.

The side plate of the display plate may have a height of about 23 mm to about 27 mm perpendicularly from a bottom surface, and the horizontal extension flange extending from an end portion of the side plate of the display tray may have a length of about 4 mm to about 6 mm.

The horizontal extension flange, the downward flange, and the upward flange may be integrally formed by bending the side plate of the display plate or separately manufactured and bonded to the side plate of the display plate via a welding.

A tray for displaying products in a bakery includes: a display plate having a holder formed at an end portion thereof; a perforated plate placed on an upper side of the display plate, wherein the display plate includes side plates on front, rear, left, and right sides thereof so that the perforated plate is seated on the upper side of the display plate and a space for accommodating the perforated plate is formed, at least one of the side plates on the front and rear sides of the display plate is provided with a holder in which a name card is to be inserted, and the holder includes: a coupling portion coupled to a bottom surface of the display plate; a side portion extending perpendicularly from the coupling portion; a horizontal extension flange that extends horizontally from the side portion to a certain length; a downward flange that is bent and extends downward from the horizontal extension flange; and an upward flange that is bent and extends upward from the downward flange to form a groove.

The coupling portion of the holder may include a plurality of coupling holes passing therethrough, the plurality of coupling holes being fixed to one end portion or a side surface of the display plate.

Advantageous Effects of Disclosure

According to a tray for displaying products in a bakery according to the present disclosure described above, a holder in which a name card may be inserted is integrally formed to improve aesthetic feeling, the display tray has a simple structure that may be easily manufactured, manufacturing costs may be reduced and productivity may be increased. In addition, because a name holder is integrally formed, excellent exterior may be obtained as compared with a shelf according to the related art.

MODE OF DISCLOSURE

Figure 1:
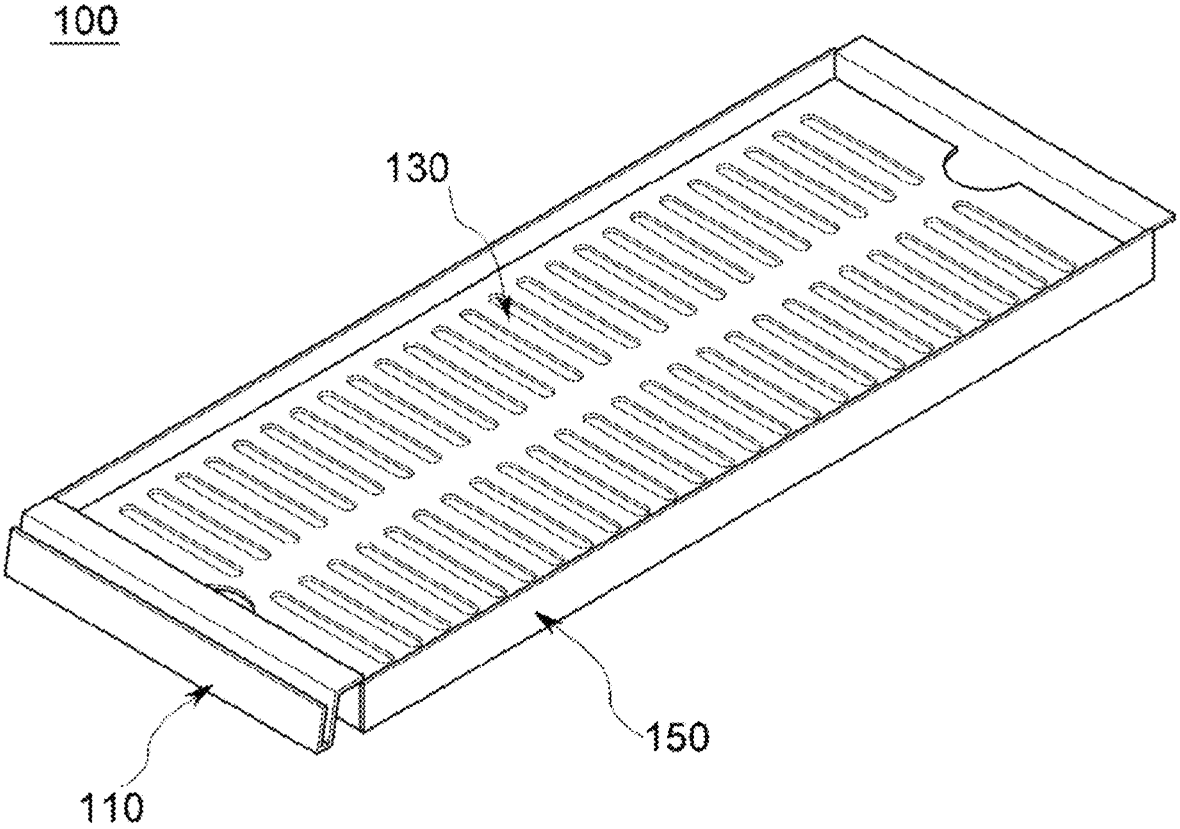
FIG. 1 is a perspective view of a tray for displaying products in a bakery, according to the present disclosure.

In order to fully understand the present disclosure, preferred embodiments of the present disclosure will be described with reference to the accompanying drawings. Embodiments of the present disclosure may be modified in various forms, and the scope of the present disclosure should not be construed as being limited to the embodiments described in detail below. The embodiments are provided so that this disclosure will be thorough and complete, and will fully convey the concept of the present disclosure to those skilled in the art. Accordingly, sizes of components in the drawings may be exaggerated for convenience of explanation. It should be noted that there are cases in which like reference numerals denote like elements. In addition, detailed descriptions of well-known functions and configurations determined to unnecessarily obscure the gist of the present disclosure will be omitted.

Figure 2:
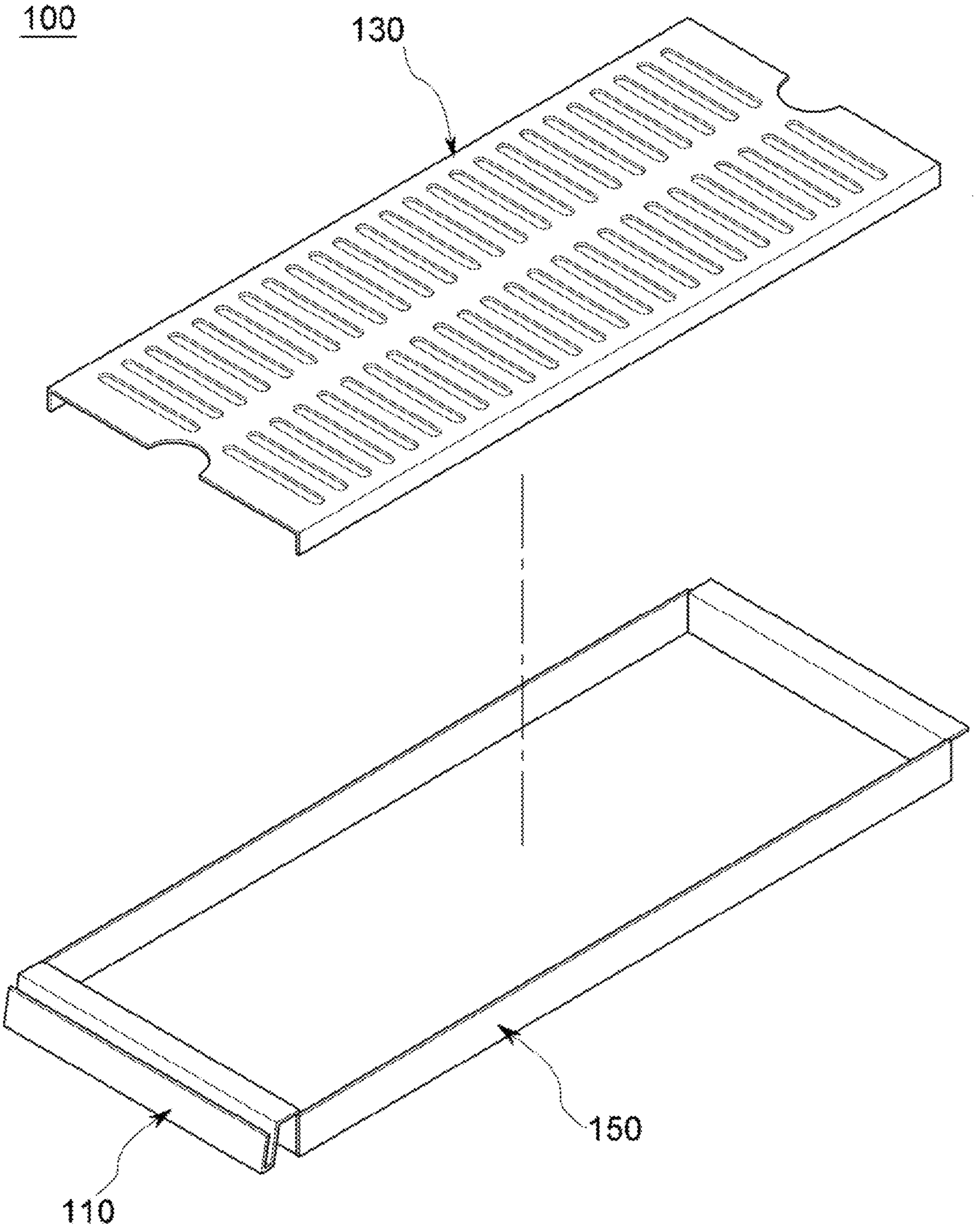
FIG. 2 is an exploded perspective view of FIG. 1.

FIG. 1 is a perspective view of a tray for displaying products in a bakery, according to the present disclosure, and FIG. 2 is an exploded perspective view of FIG. 1.

As shown in FIGS. 1 and 2, a display tray 100 according to the present disclosure includes a display plate 150 having a holder 110 formed at an end thereof, and a perforated plate 130 placed on an upper side of the display plate 150. In this case, the display plate 150 has side plates on front, rear, left and right sides thereof to form a space for accommodating the perforated plate 130, and the perforated plate 130 is seated in an accommodating space on the display plate 150.

In addition, although the display plate 150 is shown in a rectangular shape, the display plate 150 may be formed in a circular or rhombus shape according to a shape or a curvature of a display shelf, and the present disclosure is not limited to a particular shape. Therefore, the perforated plate 130 is formed to be seated on the upper side of the display plate 150 according to the shape of the display plate 150. Also, in the present disclosure, the description will be provided on the basis of the display plate 150 having a rectangular shape in which widths of the front and rear side plates are smaller than those of the left and right side plates.

In this case, at least one of the front and rear side plates having relatively small widths in the display plate 150 is provided with the holder 110 in which a name card may be inserted. Hereinafter, one of the front and rear side plates provided with the holder 110 will be referred to as a side plate for convenience of description. The holder 110 may be formed by bending the side plate of the display plate 150 or may be separately manufactured and then coupled via welding. In addition, the holder 110 has a groove 114 into which a business card or a name card may be inserted.

Figure 3:
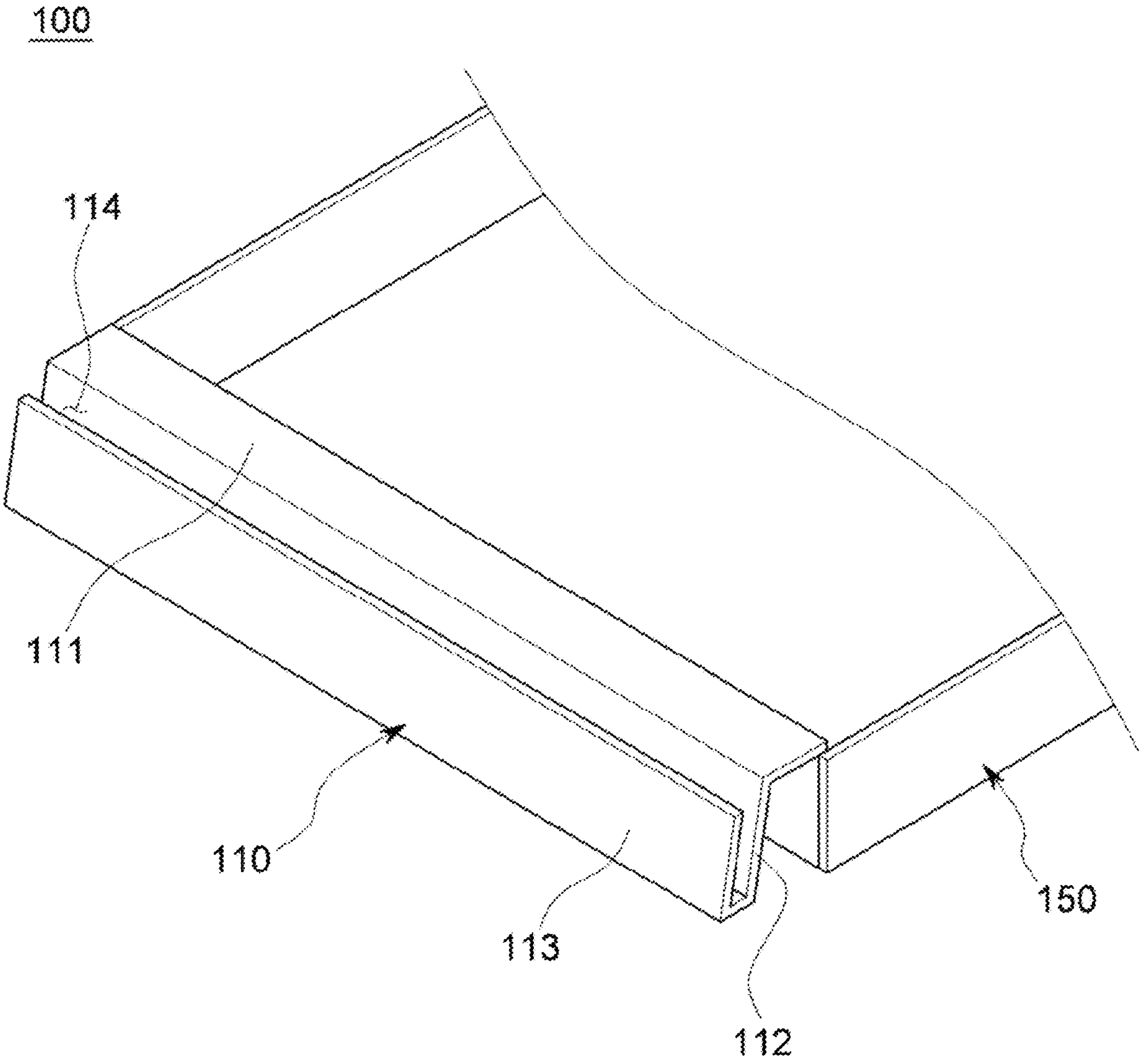
FIG. 3 is a perspective view showing an end portion of a tray according to a first embodiment of the present disclosure.
Figure 4:
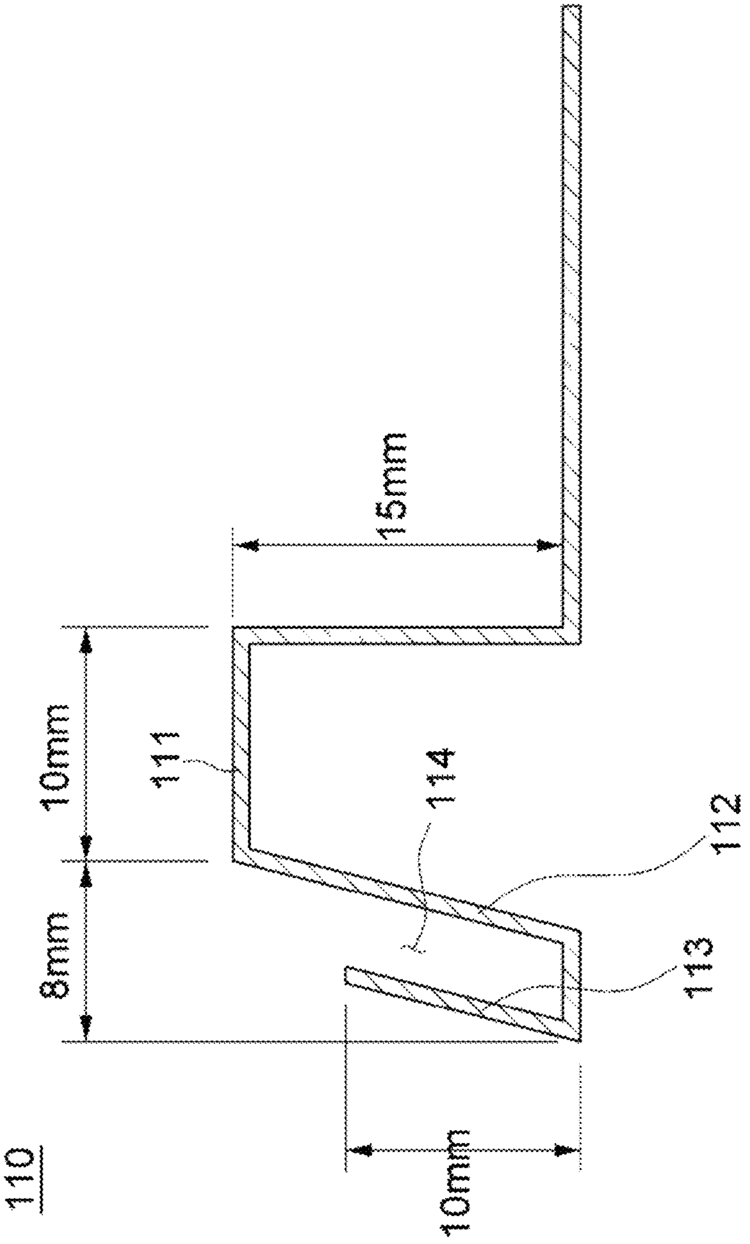
FIG. 4 is a side perspective view of the tray of FIG. 3.

FIG. 3 is a perspective view showing an end portion of a tray according to a first embodiment of the present disclosure, and FIG. 4 is a side perspective view of the tray of FIG. 3.

As shown in FIG. 3, the display tray for bakery of the present disclosure according to the first embodiment is mainly used for displaying products having a certain height, e.g., cakes, on the perforated plate 130 of the tray 100. The holder 110 includes a horizontal extension flange 111 that horizontally extends to a certain length from the side plate at the end of the display plate 150, a downward flange 112 that is bent and extends downwardly from the horizontal extension flange 111, and an upward flange 113 which is bent and extends upward again from the downward flange 112 to form the groove 114.

In addition, as shown in FIG. 4, a height of the side plate of the display plate 150 is about 13 mm to about 17 mm perpendicularly from a bottom surface, and a length of the horizontal extension flange 111 extending from the end of the side plate is formed to have a length of about 8 mm to about 11 mm. In addition, the downward flange 112 is inclined downward with a certain inclination. In addition, the upward flange 113 goes upward with a certain inclination, and thus, the groove 114 in which a business card or a name card may be inserted is formed.

In addition, an angle formed by the horizontal extension flange 111 and the downward flange 112 is the same in all embodiments to be described later, as well as the present embodiment, and is formed about 20° to about 30°. That is, the downward flange 112 is formed by an angle about 60° to about 70° from the floor. That is, when a name card is inserted into the groove 114, the name card comes into contact with the downward flange 112. In general, because the tray 100 for display in a bakery is placed on a shelf at a height of about 1 m, when the downward flange 112 is at the angle of about 60° to 70° from the floor, readability of the name card inserted in the groove 114 is the highest (refer to FIG. 12).

In addition, in this case, the horizontal extension flange 111 is formed to be about 8 mm to about 11 mm. When the horizontal extension flange 111 is formed to be less than 8 mm, products may be in touch with the name card inserted in the groove 114, which may bring customer dissatisfaction, and when the horizontal extension flange 111 exceeds 11 mm, the number of products that may be displayed on the tray 100 may be reduced.

In addition, in the embodiments of the present disclosure, the upward flange 113 extends upward to a height of 10 mm from the bottom surface to form the groove 114. Accordingly, the user allows the end portion of the name card to come into contact with the side surface of the downward flange 112, and then may easily push the name card into the groove 114. That is, when the downward flange 112 is formed to be inclined by about 20° to about 30° with respect to the horizontal extension flange 111, it is easy to insert the name card.

Figure 5:
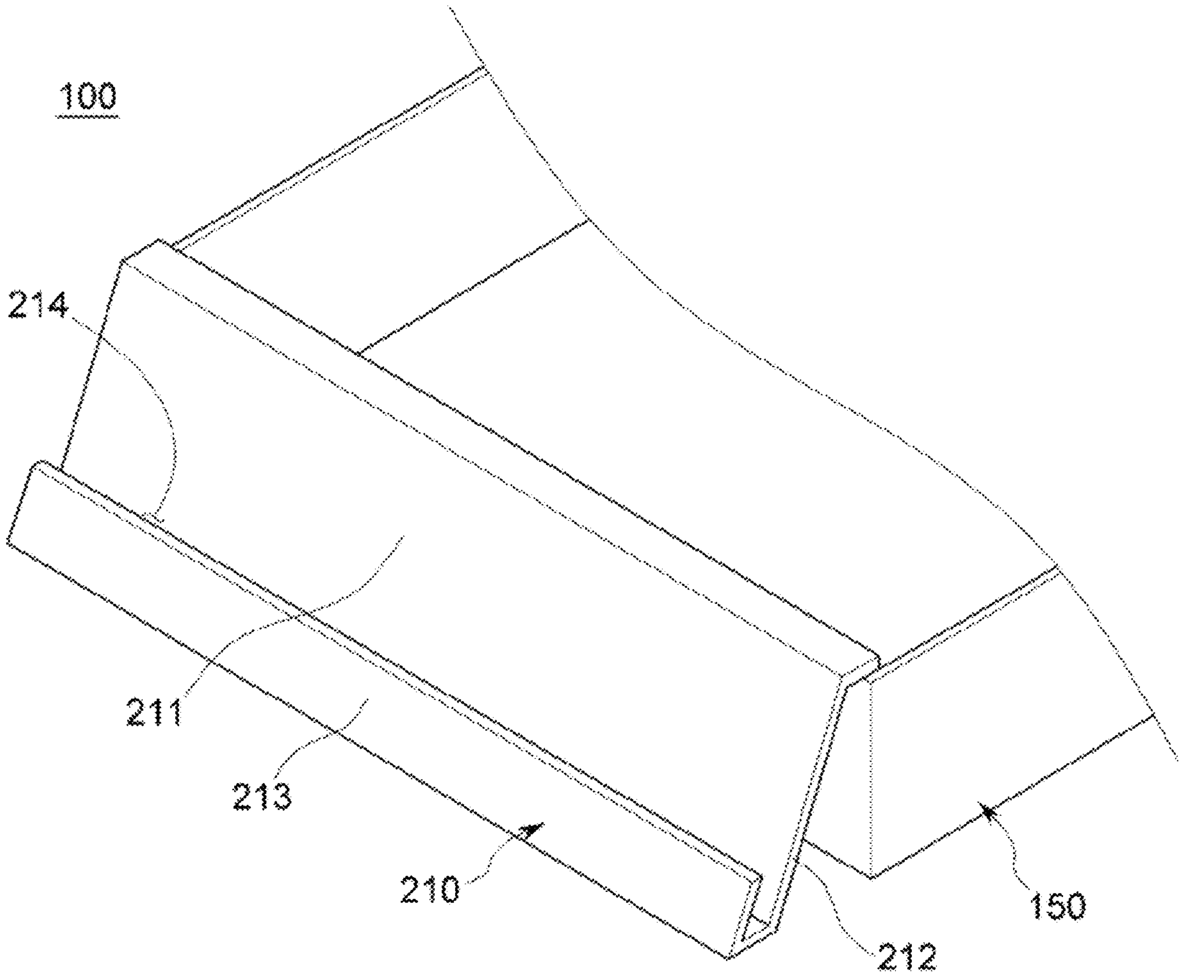
FIG. 5 is a perspective view showing an end portion of a tray according to a second embodiment of the present disclosure.
Figure 6:
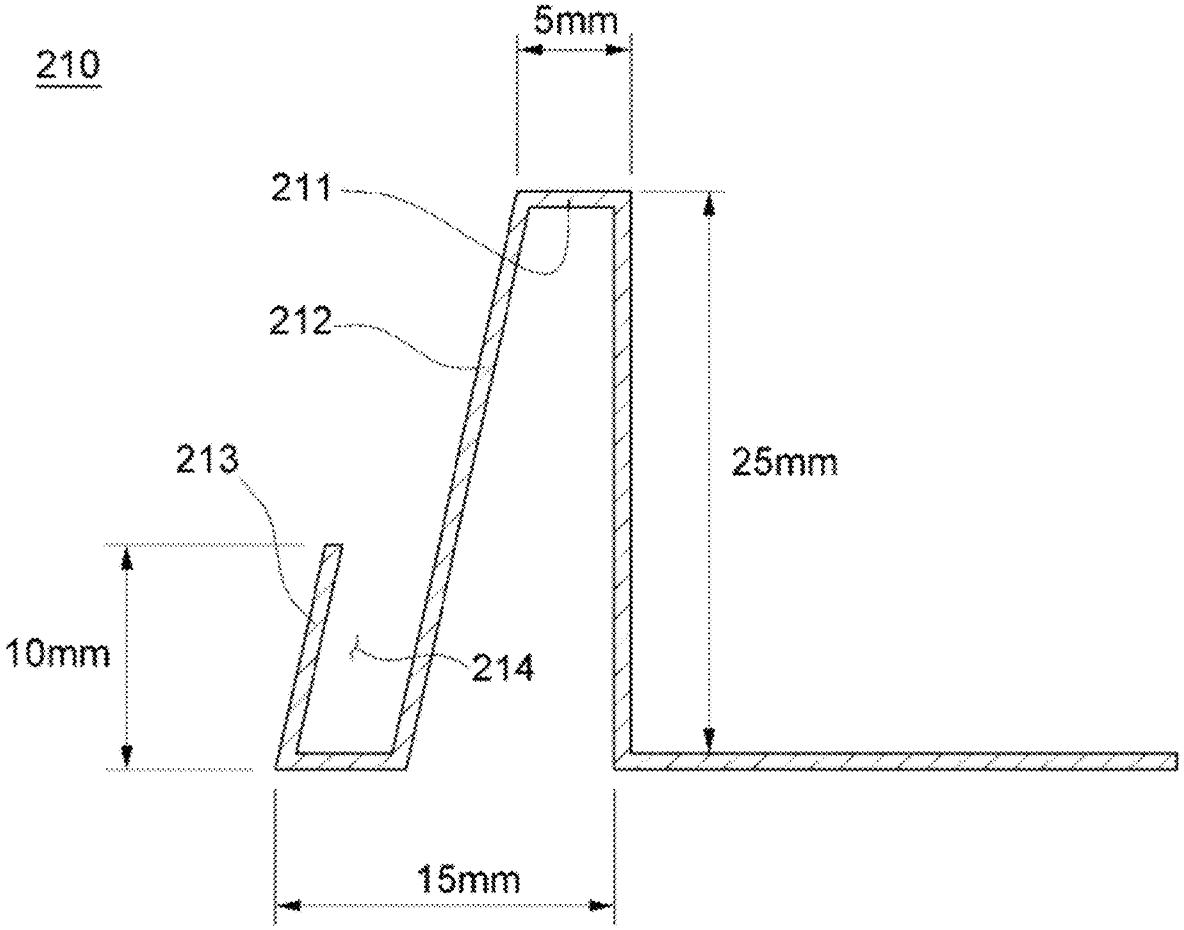
FIG. 6 is a side perspective view of the tray of FIG. 5.

FIG. 5 is a perspective view showing an end portion of a tray according to a second embodiment of the present disclosure, and FIG. 6 is a side perspective view of the tray of FIG. 5.

As shown in FIG. 5, a display tray for a bakery according to a second embodiment of the present disclosure is a tray used to display bread having a height and a volume that are less than those of the cakes that are applied to the first embodiment, on the perforated plate 130 of the tray 100. A holder 210 includes a horizontal extension flange 211 that extends from the side plate at the end portion of the display plate 150 horizontally to a certain length, a downward flange 212 that is bent and extends downward from the horizontal extension flange 211, and an upward flange 213 that is bent and extends upward from the downward flange 212 to form a groove 214.

Also, as shown in FIG. 6, the height of the side plate of the display plate 150 is formed to be about 23 mm to about 27 mm perpendicularly from the bottom surface, and a length of the horizontal extension flange 211 extending horizontally from the end of the side plate is about 4 mm to about 6 mm. In addition, the downward flange 212 is downwardly inclined with a certain inclination. In this case, the upward flange 213 goes upward again with a certain inclination and the groove 214 in which the name card may be inserted is formed.

In the present embodiment, the height of the display plate 150 is about 23 mm to about 27 mm, which is higher than that of the first embodiment. That is, the height of the display plate 150 is 23 mm or greater, because the bread having relatively small height and volume is placed on the tray, and the bread may easily fall from the tray to the floor even when a customer accidentally applies a small shock to the tray. In addition, when the height of the display plate 150 is formed excessively high, lower parts of the bread are blocked and may not be seen, and thus, the height may be set to be at least 27 mm or less. In this case, because the perforated plate 130 is mostly mass-produced to have the height of 10 mm at low costs, a space having a height of about 15 mm may be formed even when the holder 210 according to the present embodiment is used.

In addition, the horizontal extension flange 211 is formed to have a width of about 4 mm to about 6 mm. When a width of the horizontal extension flange 211 is too large, e.g., exceeds 6 mm, the number of products that may be displayed decreases, and when the width of the horizontal extension flange 211 is less than 4 mm, there is a limitation in forming aesthetic feeling.

Also, the upward flange 213 extends upward to 10 mm from the bottom surface, as in the first embodiment. Accordingly, the user allows the bottom surface of the name card to come into contact with the side surface of the downward flange 212, and then may easily push the name card into the groove 214.

In addition, the tray 100 according to the first and second embodiments of the present disclosure may be formed of a metal alloy material harmless to the human body, and the holders 110 and 210 may be integrally formed and used by bending the side plate of the display plate 150.

Figure 7:
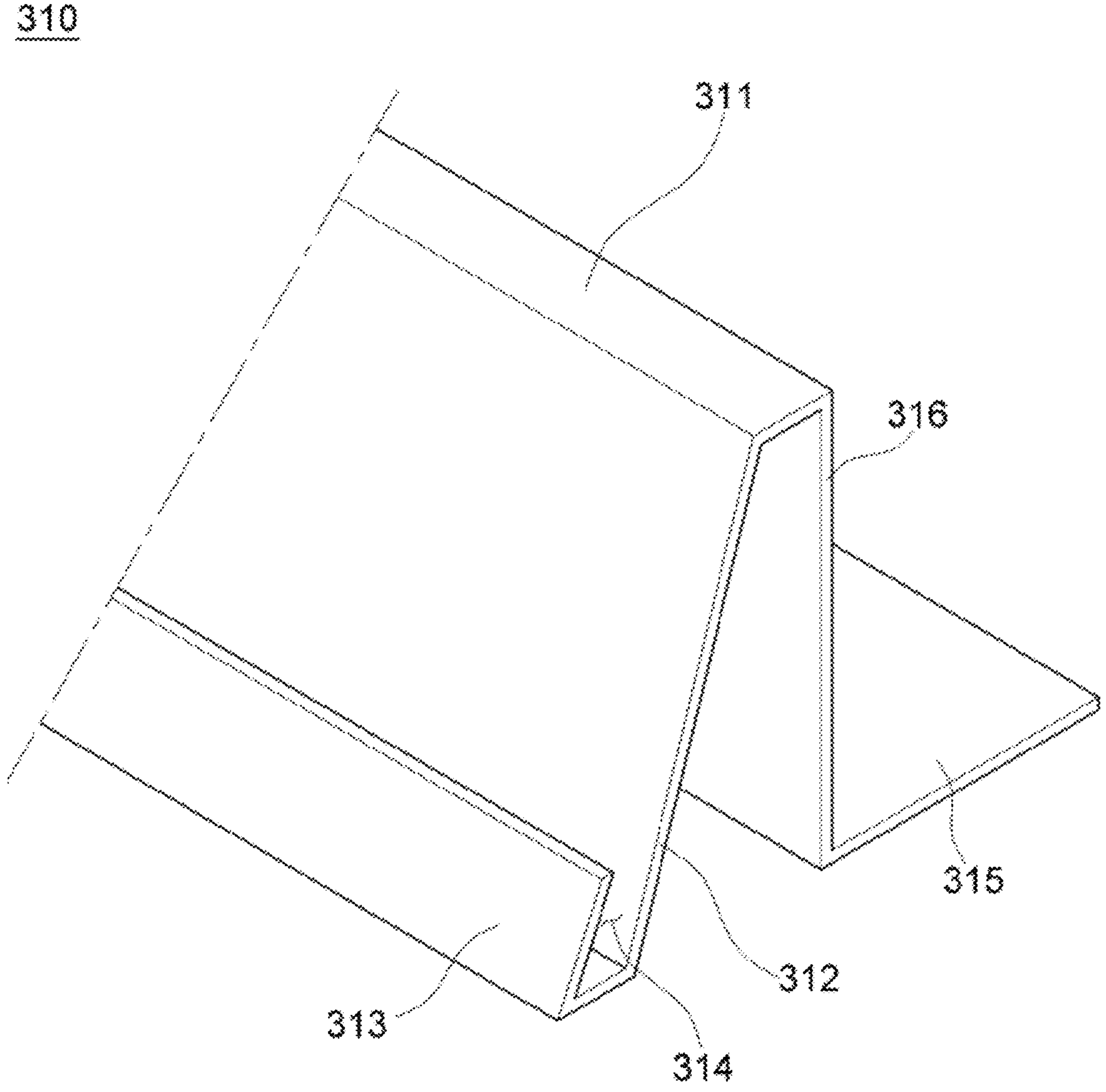
FIG. 7 is a perspective view showing an end portion of a tray according to a third embodiment of the present disclosure.
Figure 8:
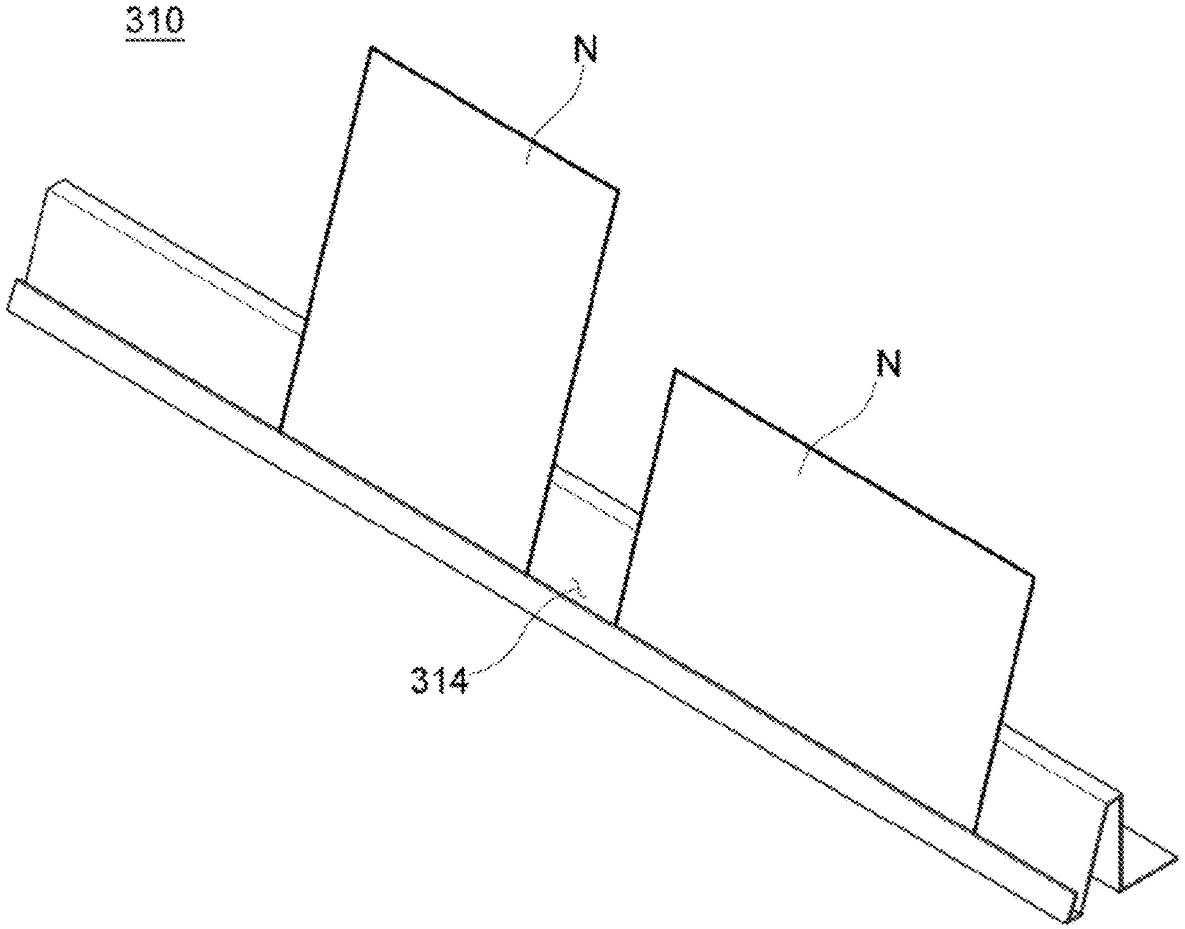
FIG. 8 is a perspective view showing the tray of FIG. 7 seen from a different angle.
Figure 9:
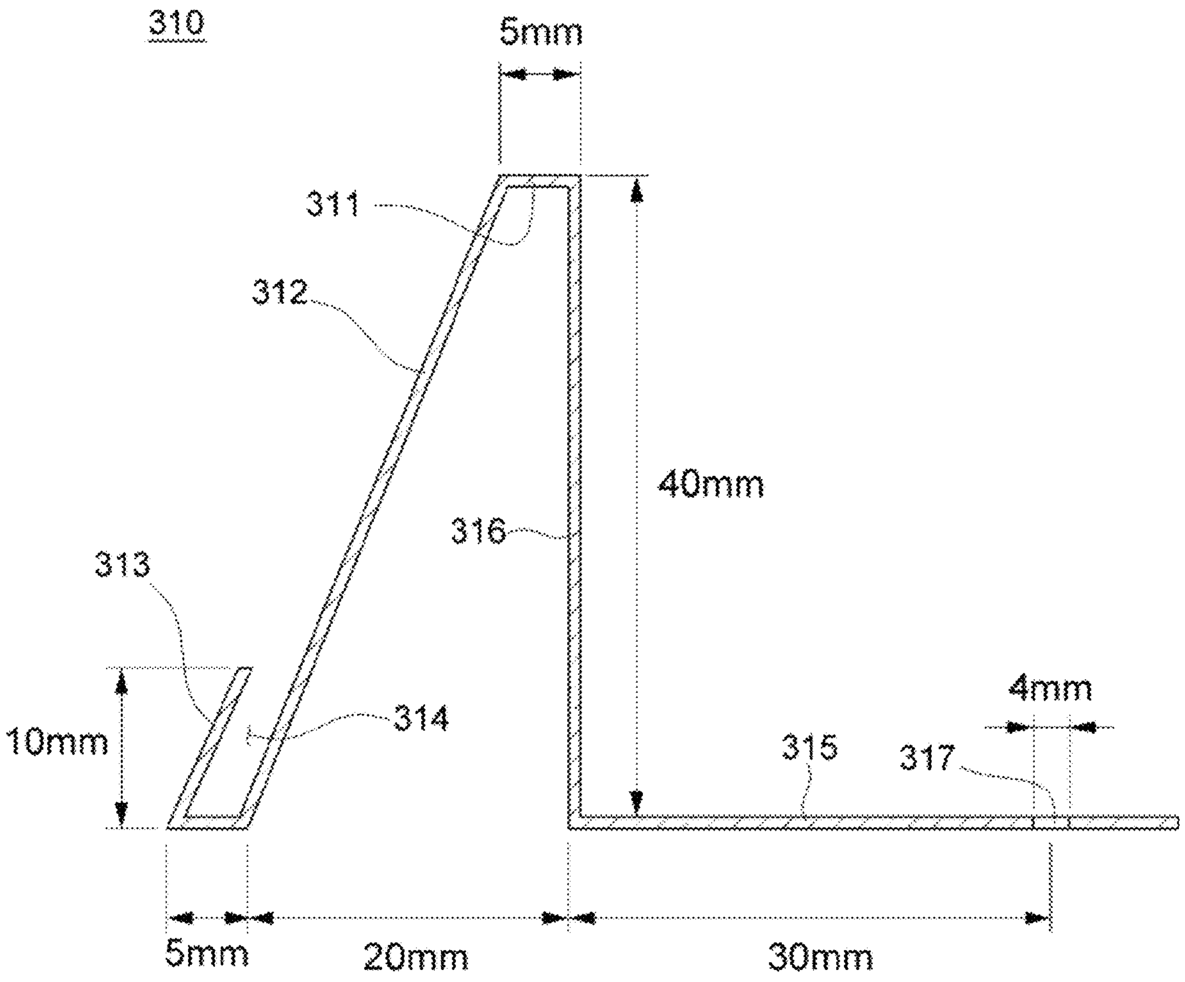
FIG. 9 is a side perspective view of the tray of FIG. 7.
Figure 10:
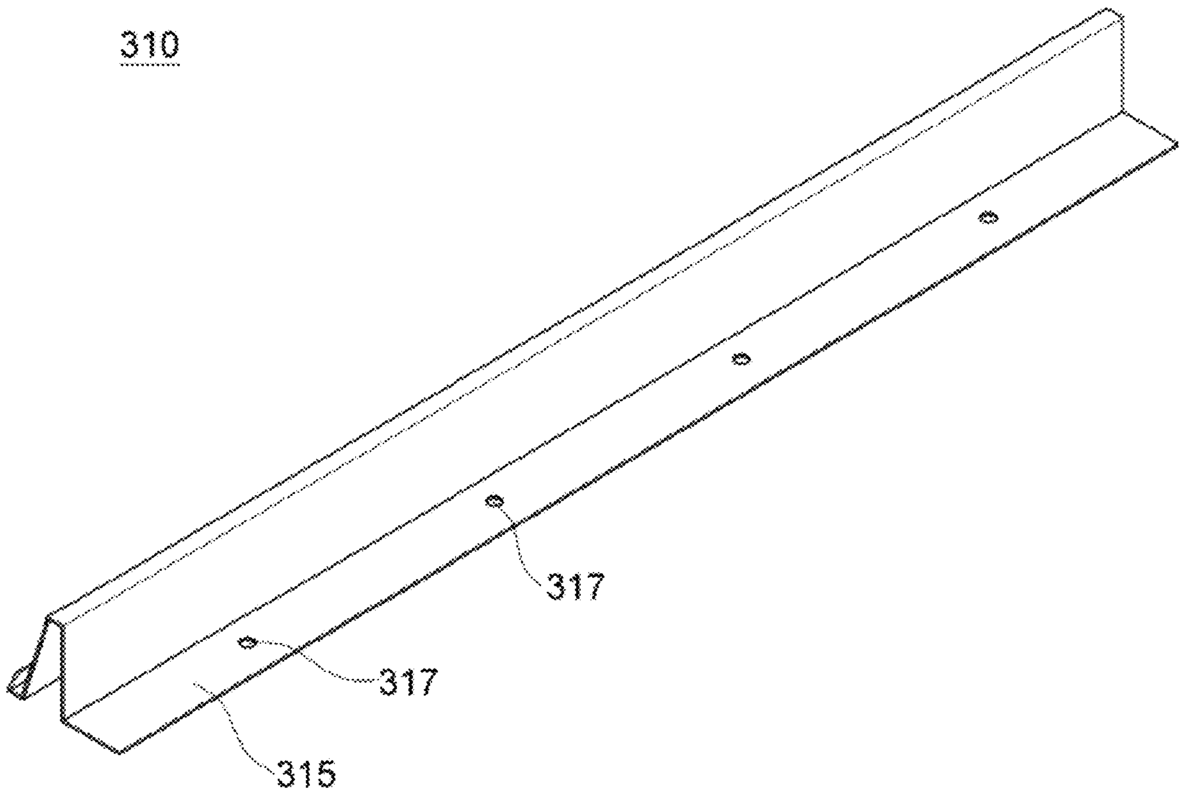
FIG. 10 is a perspective view of the tray of FIG. 7 seen from above.

FIG. 7 is a perspective view of an end portion of a tray according to a third embodiment of the present disclosure, FIG. 8 is a perspective view of the tray of FIG. 7 seen from a different angle, FIG. 9 is a side perspective view of the tray of FIG. 7, and FIG. 10 is a perspective view of the tray of FIG. 7 seen from above.

As shown in FIGS. 7 to 9, a holder 310 according to the third embodiment of the present disclosure includes a coupling portion 315 coupled to the bottom surface of the display plate 150, a side portion 316 extending perpendicularly from the coupling portion 315, a horizontal extension flange 311 that extends horizontally from the side portion 316 to a certain length, a downward flange 312 that is bent and extends downward from the horizontal extension flange 311, and an upward flange 313 that is bent and extends upward from the downward flange 312 to form a groove 314. In particular, in the present embodiment, the holder 310 is provided with the coupling portion 315 that is separately coupled to or detached from one end portion of the display plate 150.

Figure 12:
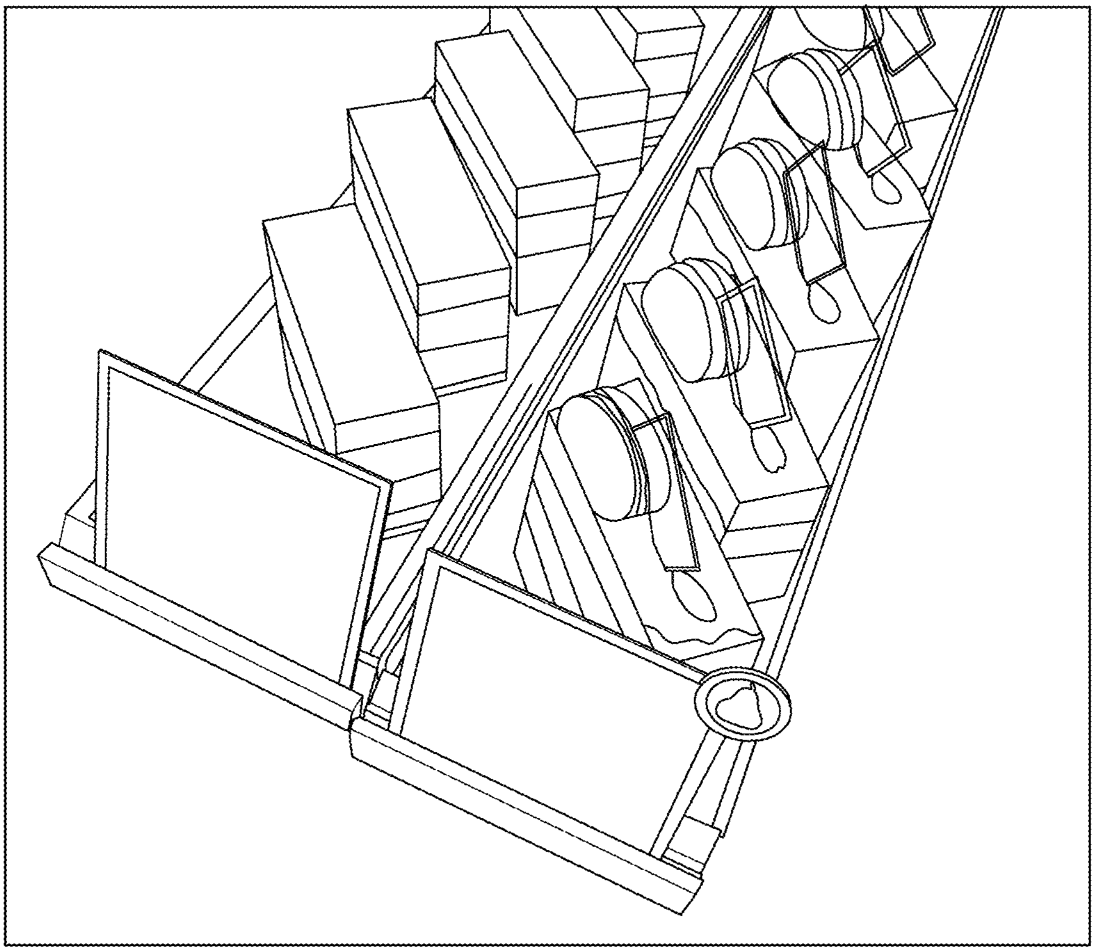
FIG. 12 is a photograph showing an example to which the tray for displaying products in a bakery according to the present disclosure is applied.

In addition, the holder 310 may be formed to have a length that is at least twice as long as the width of the display plate 150, for example, may be arranged at front edges of two display plates 150 that are bonded to each other as shown in FIG. 12.

In addition, a height of the side portion 316 is about 35 mm to about 45 mm perpendicularly from the bottom surface, a length of the horizontal extension flange 311 that horizontally extends from the end portion of the side portion 316 is about 4 mm to about 6 mm, and the downward flange 312 is inclined downward with a certain inclination. In this case, the upward flange 313 goes upward again with a certain inclination from the bottom surface so as to form the groove 314 in which the business card or the name card may be inserted. Because the side portion 316 has a height that is greater than those of the holders 110 and 210 in the first and second embodiments, the coupling portion 315 may be inserted in the bottom of the holder 110 or 210 at the front edge of the holder 110 or 210 to be coupled.

In addition, the upward flange 313 extends upward to 10 mm from the bottom surface like in the first and second embodiments. Accordingly, the user may allow the end portion of the name card to come into contact with the side surface of the downward flange 312 and then easily push the name card into the groove 314. In addition, according to the present embodiment, a product information board having A5 size that is larger than the name card may be inserted, as well as the name card having the business card size.

As shown in FIG. 10, a plurality of coupling holes 317 are formed passing through the coupling portion 315 of the holder 310. Accordingly, the holder 310 according to the present disclosure may be fixed to one end portion or the side surface of the display plate 150. Alternatively, the coupling portion 315 of the holder 310 may be bonded through a $CO_2$ welding of a part that is in contact with the bottom surface of the display plate 150.

Figure 11:
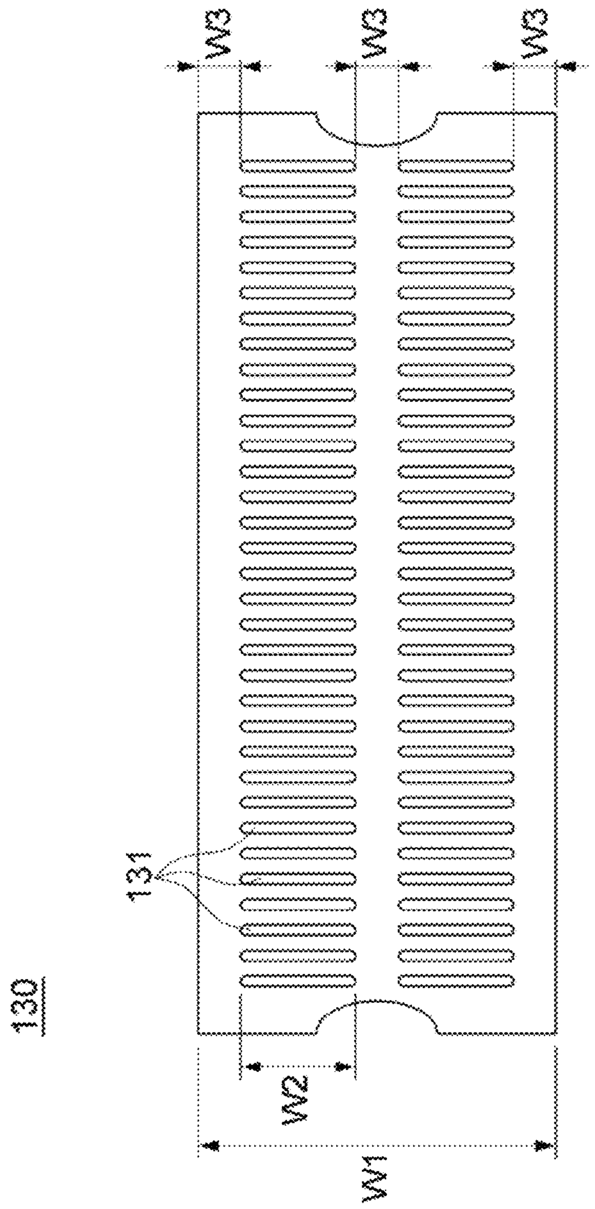
FIG. 11 is a perspective view of a perforated plate of FIG. 2.

FIG. 11 is a perspective view of the perforated plate of FIG. 2.

As shown in FIG. 11, the perforated plate 130 is placed on the upper side of the display plate 150, and cakes or bread may be placed and displayed on the upper side of the perforated plate 130. In this case, the display plate 150 has side plates on front, rear, left and right sides thereof to form a space for accommodating the perforated plate 130, and the perforated plate 130 is seated on the upper side of the display plate 150. In addition, although the perforated plate 130 is shown in a rectangular shape, the perforated plate 130 may be formed in a circular or rhombus shape according to a shape or a curvature of a display shelf, and the present disclosure is not limited to a particular shape. Therefore, the perforated plate 130 is formed to be seated on the upper side of the display plate 150 according to the shape of the display plate 150.

In addition, a plurality of through-holes 131 are formed in a lengthwise direction of the perforated plate 130 by perforating the perforated plate 130. In detail, the perforated plate 130 has a rectangular shape having shorter sides of a length W1 and longer sides, the through-holes 131 each have a certain length W2 in the lengthwise direction thereof, and as shown in the drawings, the through-holes 131 are perforated in two columns in the perforated plate 130. The through-holes 131 are formed at certain intervals W3 on the shorter side of the perforated plate 130, and two columns of through-holes 131 also have the same interval W3 therebetween. Therefore, when cakes or bread is placed on the upper side of the perforated plate 130, freshness may be maintained by the through hole 131.

FIG. 12 is a photograph showing an example to which the tray 100 for display in a bakery according to the present disclosure is applied. According to the tray 100 of the present disclosure, a name card on which product name or price is indicated may be inserted in the front edge of the tray 100, and a plurality of trays 100 on which products are placed are displayed in a line on a shelf. Thus, product information may be identified easily, and aesthetic feeling of the products may be improved.

The embodiments of the display tray for bakery according to the present disclosure described above are merely examples, and it will be understood by those of ordinary skill in the art that various changes in form and details may be made therein without departing from the spirit and scope as defined by the following claims. Therefore, it will be understood that the present disclosure is not limited to the form mentioned in the above detailed description. Therefore, the scope sought to be protected of the disclosure shall be defined by the appended claims. Also, it has to be understood that the present disclosure includes all modifications, equivalents and substitutions within the spirit and scope of the disclosure as defined by the appended claims.

THE EXPLANATION OF REFERENCE NUMERALS

100: tray
110, 210, 310: holder
111, 211, 311: horizontal extension flange
112, 212, 312: downward flange
113, 213, 313: upward flange
114, 214, 314: groove
130: perforated plate
131: through-holes
150: display plate
315: coupling portion
316: side portion
317: coupling holes

The invention claimed is:

1. A tray for displaying products in a bakery, the tray comprising:

a display plate having a holder formed at an end portion thereof; and a perforated plate placed on an upper side of the display plate, wherein the display plate includes side plates on front, rear, left, and right sides thereof to form a space for accommodating the perforated plate so that the perforated plate is seated on the upper side of the display plate, at least one of the side plates on the front and rear sides of the display plate is provided with the holder in which a name card is to be inserted, and the holder comprises:

a coupling portion coupled to a bottom surface of the display plate;

a side portion extending perpendicularly from the coupling portion;

a horizontal extension flange that extends horizontally from the side portion to a certain length;

a downward flange that is bent and extends downward from the horizontal extension flange; and an upward flange that is bent and extends upward from the downward flange to form a groove.

2. The tray of claim 1, wherein the coupling portion of the holder includes a plurality of coupling holes passing therethrough, the plurality of coupling holes being fixed to one end portion or a side surface of the display plate.

* * * * *